US012639147B2

(12) United States Patent
Baker et al.

(10) Patent No.: US 12,639,147 B2
(45) Date of Patent: May 26, 2026

(54) DETECTION OF EVENTS OF INTEREST USING A NATURAL LANGUAGE PROCESSING SYSTEM

(71) Applicant: Microsoft Technology Licensing, LLC, Redmond, WA (US)

(72) Inventors: William Tigard Baker, Redmond, WA (US); Dallas Allen Warren, Redmond, WA (US); Swamy V.P.L.N. Nallamalli, Bothell, WA (US); Aaron Edward Dietrich, Kirkland, WA (US); Piyush Gupta, Kirkland, WA (US); Robert M. Fries, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 18/517,205

(22) Filed: Nov. 22, 2023

(65) Prior Publication Data

US 2025/0165326 A1 May 22, 2025

(51) Int. Cl.
| | |
|---|---|
| *G06F 11/00* | (2006.01) |
| *G06F 11/07* | (2006.01) |
| *G06F 11/30* | (2006.01) |
| *G06F 11/3668* | (2025.01) |
| *G06F 40/30* | (2020.01) |

(52) U.S. Cl.
CPC ...... G06F 11/0766 (2013.01); G06F 11/3692 (2013.01); G06F 40/30 (2020.01)

(58) Field of Classification Search
CPC ... G06F 11/0766; G06F 40/30; G06F 11/3692
See application file for complete search history.

(56) References Cited

U.S. PATENT DOCUMENTS

| | | | | |
|---|---|---|---|---|
| 9,454,465 | B1 * | 9/2016 | Jhoney | G06F 11/3692 |
| 2023/0367699 | A1 * | 11/2023 | Dietrich | G06F 11/368 |
| 2024/0111577 | A1 * | 4/2024 | Shah | G06F 11/0766 |
| 2025/0004886 | A1 * | 1/2025 | Wuest | G06F 11/1469 |

* cited by examiner

*Primary Examiner* — Philip Guyton
*Assistant Examiner* — Sean Kevin Mcnamara

(57) ABSTRACT

A system and method for providing automated event of interest detection and reporting for software testing. The technology described herein uses natural language processing to identify events of interest based on natural language included in log files messages and/or telemetry event items of software under test. Identified events of interest are reported to one or more downstream services. In some examples, events of interest are mapped to action sequences of interest that can be replayed to reproduce events of interest without requiring event of interest criteria to be defined. In some examples, events of interest are reported to a health/status dashboard and/or a listener that responds to reported events of interest.

20 Claims, 6 Drawing Sheets

100

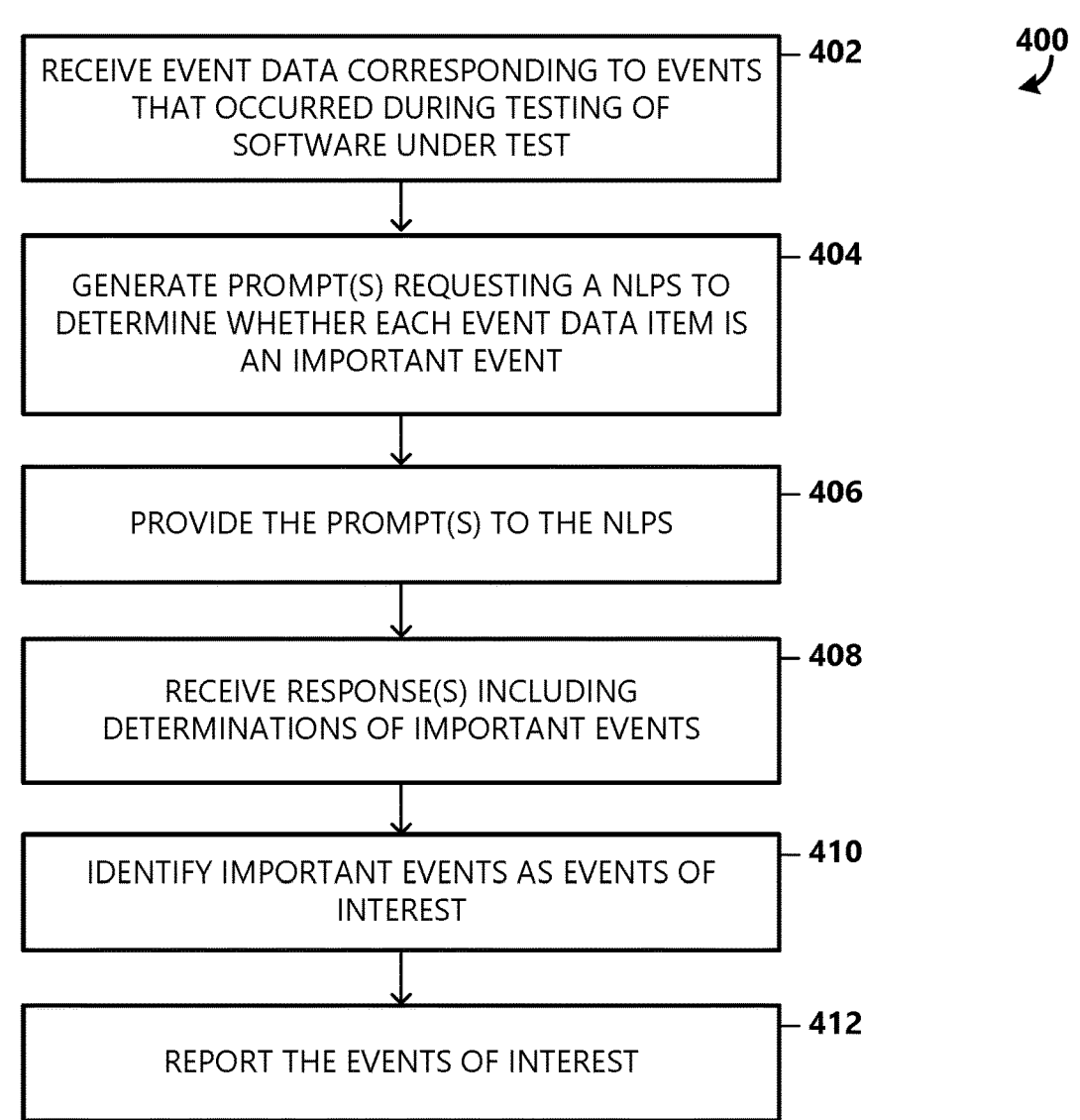

400

RECEIVE EVENT DATA CORRESPONDING TO EVENTS THAT OCCURRED DURING TESTING OF SOFTWARE UNDER TEST — 402

GENERATE PROMPT(S) REQUESTING A NLPS TO DETERMINE WHETHER EACH EVENT DATA ITEM IS AN IMPORTANT EVENT — 404

PROVIDE THE PROMPT(S) TO THE NLPS — 406

RECEIVE RESPONSE(S) INCLUDING DETERMINATIONS OF IMPORTANT EVENTS — 408

IDENTIFY IMPORTANT EVENTS AS EVENTS OF INTEREST — 410

REPORT THE EVENTS OF INTEREST — 412

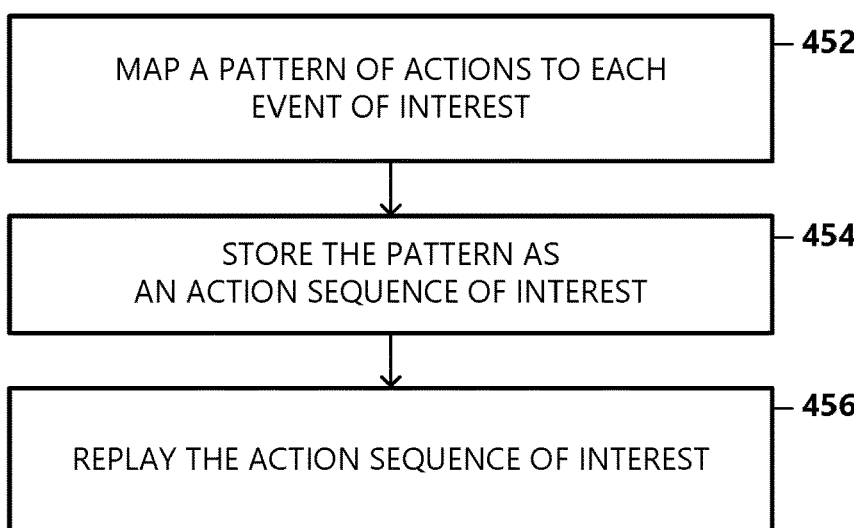

```
┌─────────────────────────────────┐
│  MAP A PATTERN OF ACTIONS TO EACH │─ 452
│       EVENT OF INTEREST           │
└─────────────────────────────────┘
                │
                ▼
┌─────────────────────────────────┐
│        STORE THE PATTERN AS       │─ 454
│  AN ACTION SEQUENCE OF INTEREST   │
└─────────────────────────────────┘
                │
                ▼
┌─────────────────────────────────┐
│  REPLAY THE ACTION SEQUENCE OF INTEREST │─ 456
└─────────────────────────────────┘
```

FIG. 4B

DETECTION OF EVENTS OF INTEREST USING A NATURAL LANGUAGE PROCESSING SYSTEM

BACKGROUND

Automated software testing for complex environments, such as operating systems or the applications running thereon, simulates diverse interactions with software being tested. Simulated usage during testing allows for detection of bugs before they turn into usability or security issues after deployment. In some examples, automated testing includes exercising actions against software being tested autonomously in search of rewards indicating that an event of interest has been triggered.

It is with respect to these and other considerations that examples have been made. In addition, although relatively specific problems have been discussed, it should be understood that the examples should not be limited to solving the specific problems identified in the background.

SUMMARY

The technology described herein provides automated event of interest detection. In examples, natural language processing is used to identify events of interest based on natural language included in event data, such as in log files and/or telemetry events of software under test. Events of interest are identified without requiring criteria to be defined. In some implementations, events of interest are reported to software owners as service health data. In some implementations, events of interest are reported to a listener of and responder to events of interest. In other implementations, machine learning is used to detect patterns of actions that trigger the events of interest and to build action sequences that include the detected action patterns. For instance, the action sequences are used for replay testing, exploitation testing, as training data, etc.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

FIG. 4A is a flow diagram depicting an example method of automatically identifying and reporting events of interest according to an aspect;

FIG. 4B is a flow diagram depicting an example method of generating an action sequence of interest to trigger an identified event of interest.

DETAILED DESCRIPTION

Figure 1:
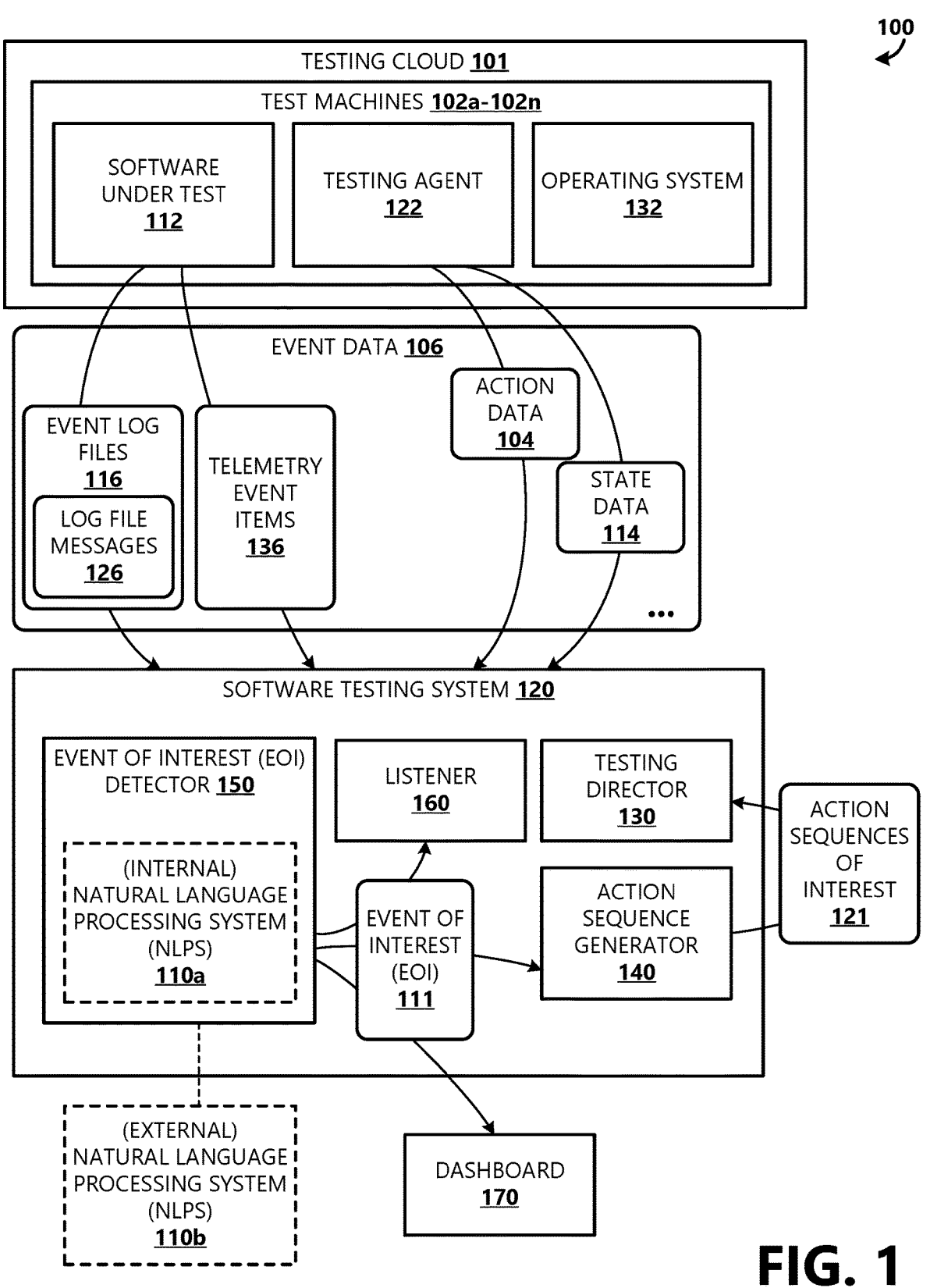
FIG. 1 is a block diagram of an example software testing environment in which automated event of interest detection and reward generation may be implemented according to an aspect.

Aspects described herein use natural language processing and machine learning to provide automated event of interest detection in automated software testing. In some aspects, an event of interest is an event that occurs in software under test or a test machine on which the software is being tested that holds particular significance or relevance to a user and/or to the functionality of the software under test. For instance, an event of interest may be significant or relevant when it triggers a resulting state that is significant or relevant to validating software under test and/or is described as being significant or relevant. In some examples, an event of interest is associated with a negative event in the software under test, such as failing to complete a user scenario, an exception, a crash, an unexpected event, a warning, a degradation in performance, an assertion error, the surfacing of an error message, etc. In other examples, an event of interest is associated with a positive event, such as completion of a task or a new or particular user scenario.

In some examples, events of interest are reported to users of a software testing system as indications of important events that occurred during testing of software under test. In further examples, events of interest are mapped to sequences of actions. Machine learning (ML) models (e.g., Term Frequency-Inverse Document Frequency (TF-IDF) and Word to Vector (Word2Vec)) to generate mappings. For instance, action sequences that trigger events of interest can be replayed to determine root causes of events (e.g., crashes) that occurred during testing, to protect the software under test against regressions, etc. In some implementations, events of interest are used for software (e.g., product or service) health monitoring and reporting. As an example, events of interest are provided to a health/status dashboard (e.g., to inform users (e.g., customers, administrative users, software testing engineers) of important events that have been observed in software product/service).

A software product may be tested using automated testing methods that include performing actions against the software product running on one or a plurality of test machines. When testing a software product, an action typically includes an interaction with and an observation of a state of the software product via an interface supported by the software product. For instance, the action may include an interaction with a user interface (UI) element via an accessibility function built into the software and/or the operating system running on the test machine, an application programming interface (API) call to one or more Representational State Transfer (REST) APIs (e.g., when testing a REST-ful service), etc. A resulting state is a description at a point in time of software and machine conditions resulting from the interaction. In some examples, an automated testing system may randomly explore paths it finds based on elements observed through one or more APIs (e.g., interactive UI elements observed on a screen of the test machine and RESTful services observed through a REST API).

In examples, various event data is collected during testing a software product. According to one example, a log file is generated during testing including details about events that occur during testing various actions. For instance, the software product under test records log messages in the log file (herein referred to as log file messages) including descriptive information that may help users understand details of events that occur in the software. Log file messages are typically unstructured and include natural language text intended to be read by a human. For instance, log file messages may vary in format and content. Currently, meaningful information included in a log file message may be extracted via manually authored and maintained filters and/ or queries. In some implementations, log files are used for debugging and troubleshooting, where a developer may use the log file to record log file messages corresponding to specific events, error messages, or debugging information during development and testing. Log file messages may include metadata, such as timestamps, identifiers, device information, etc. An example log file message is: "[INF] [Oct. 26, 2021 06:16:04]: (E:\BA\142\\\src\Common\SecretHelpter.cs:117, RetrieveMSACredentials) Exercised the scenario of user hitting a Submit button".

According to another example, telemetry data recorded by the software under test may be used to monitor execution of the software under test during testing. One example telemetry data type includes a telemetry event, where a telemetry event item is recorded to capture an interaction with the software under test. Telemetry event items may be used for real-time monitoring of the health/status of the software under test. For instance, telemetry event items may log operations executed to process received requests, exceptions that cause operations to fail, dependency calls to external services, storage, or other endpoints (e.g., a REST API, Structured Query Language (SQL) database, a HyperText Transfer Protocol (HTTP) resource), etc. In examples, telemetry event items are structured data (e.g., key-value pairs) optimized for being machine readable. In some examples, telemetry event items include standardized information, such as timestamps, request execution details, exceptions, dependencies, etc. An example telemetry event item is: "{Time: Oct. 26, 2021 06:16:04, Area: MSACredentials, Event: RetrieveSuccess, Reason: ManualSubmit}".

In further examples, event data includes data collected by the software testing system. For instance, event data includes action data corresponding to actions performed by the software testing system on the software under test and corresponding state data observed by the software testing system resulting from performing the actions are recorded and stored. Other types of event data may be collected during testing the software product.

According to aspects, the technology described herein automatically detects and reports events of interest based on natural language processing of event data, such as log file messages and telemetry event items. For instance, a natural language processing system is used to determine whether an event described in a log file message or telemetry event item is an event of interest. In some examples, a prompt is generated that includes the log file message or telemetry event item and a request for a determination of whether an event of interest is described. In some examples, a description of events of interest are included in the prompt. When a response is received that indicates the event is determined by the natural language processing system as an event of interest, the event is recorded as an event of interest and reported to one or more downstream systems or users.

In some previous methods, events of interest are identified based on defined event of interest criteria (e.g., rules specifying events, actions, or state conditions). Defining event of interest criteria for identifying events of interest in a software product can entail significant resource expenses, such as time, effort, money, and/or specialized skills, and can reduce the speed at which customers can onboard their software products for automated testing. Additional costs may be associated with defined events of interest, such as costs associated with updating event of interest criteria as the software product under test evolves over time. Thus, the technology described herein improves upon existing software testing technology in several ways, including by making efficient use of computer resources. The goal is to use the least amount of resources to find the highest number of events of interest in the software under test. The technology described herein takes the software under test event data (e.g., log file messages, telemetry event items, and/or other types of event data) as primary inputs and automatically detects events of interest, without requiring the event of interest criteria to be defined, which is in contrast to many existing technologies that require event of interest criteria to be defined as part of the input. Additionally, aspects of the present disclosure allow for event data to be in any format. That is, log file messages and telemetry events are not required to adhere to a specific structured format for the detection of events of interest. Further, the technology described herein does not require manual authoring and/or maintenance of filters and/or queries for processing log files or telemetry events.

Figure 5:
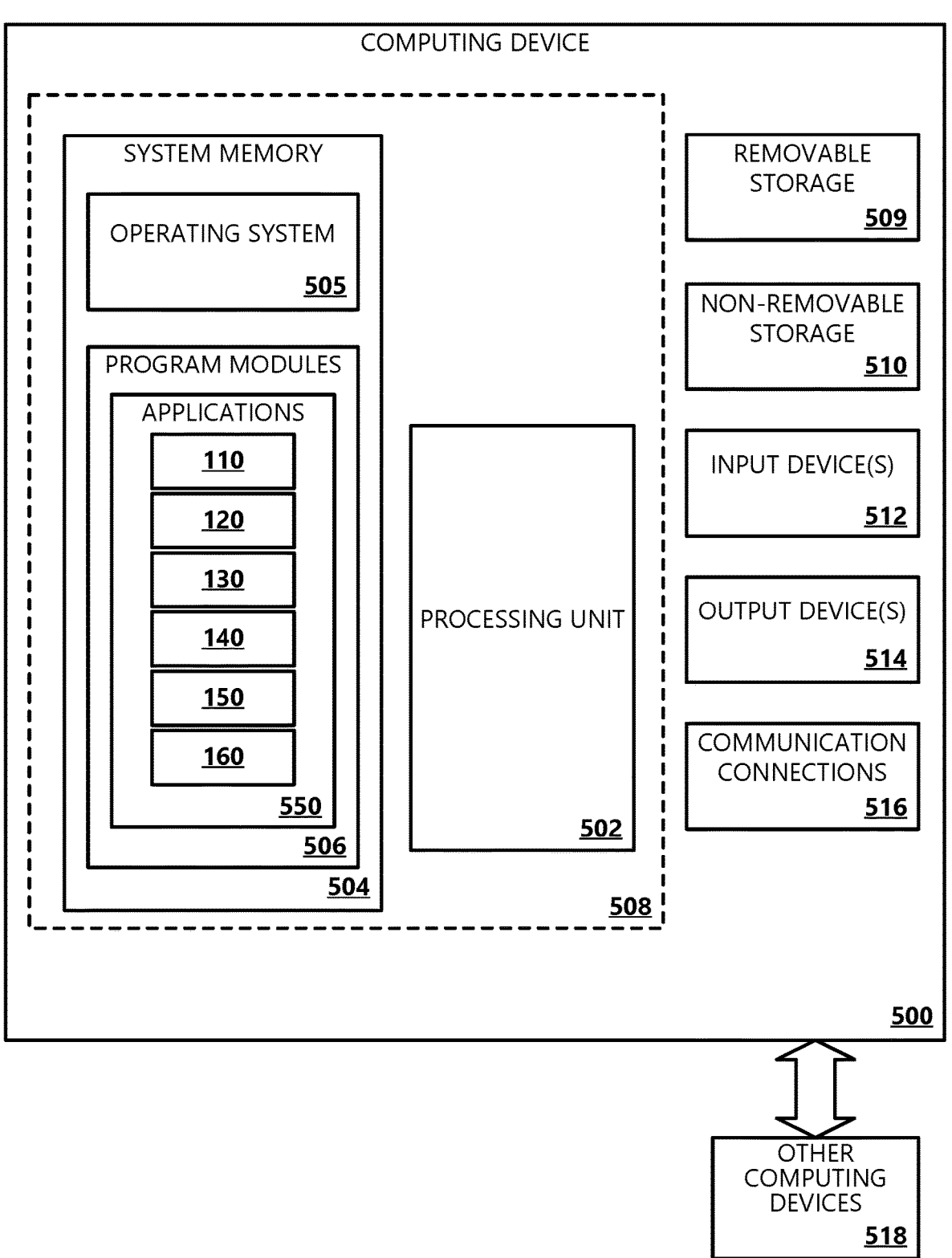
FIG. 5 is a block diagram illustrating example physical components of a computing device with which aspects of the disclosure may be practiced.

With reference now to FIG. 1, a block diagram of a software testing environment 100 is depicted in which automated reward generation for testing events of interest in software product testing may be implemented in accordance with examples described herein. The example software testing environment 100, as depicted, is a combination of interdependent components that interact to form an integrated whole. Some components are illustrative of software applications, systems, or modules that operate on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art. In one example, components of systems disclosed herein are implemented on a single processing device. The processing device provides an operating environment for software components to execute and utilize resources or facilities of such a system. An example of a processing device comprising such an operating environment is depicted in FIG. 5. In another example, the components of systems disclosed herein are distributed across multiple processing devices. For instance, input may be entered on a user device or client device and information may be processed on or accessed from other devices in the network, such as one or more remote cloud devices or web server devices. The network may include one or more local area networks (LANs) and/or wide area networks (WANs). In example implementations, a network includes the Internet, an intranet, and/or a cellular network, amongst any of a variety of possible public and/or private networks.

Among other components not shown, the software testing environment 100 includes a testing cloud 101 including one or more test machines 102a-102n (collectively, test machines 102) and a centralized software testing system 120 connected, in some examples, by a network. A testing cloud 101 refers to a cloud-based testing environment or platform that provides testing infrastructure, resources, and services for software testing and quality assurance activities. Any number of test machines 102 may be used in the testing cloud 101. Each test machine 102 includes software under test 112 along with a simulated computing environment, including an operating system 132. In some examples, a test machine 102 is a virtual machine. In other examples, the test machine 102 is a physical machine. A testing agent 122 is directed by a testing director 130 of the software testing system 120 to perform actions on software under test 112. In some examples, the testing agent 122 operates on the test machine 102. In other examples, the testing agent 122 is located on a different machine than the software under test 112.

The testing director 130 assigns one or different test types to different test machines 102. For example, a first group of test machines 102 may do random walk testing (described below), while a second group follows action sequences 128 to complete a task. A third group may perform pioneering exploration, which is directed to exploring previously unexplored, and thus unknown areas of an action space, where the action space includes possible actions that the software testing system may take on software under test.

In some implementations, the testing agent 122 opens and interacts with the software under test 112 via APIs supported by the software under test 112. In examples, the testing agent 122 observes a current state within the environment of the software under test 112, performs an action, and observes a next state of the software under test 112. In some examples, the testing agent 122 leverages an accessibility layer (e.g., the MICROSOFT User Interface (UI) Automation System) of the operating system 132 of the test machine 102 to observe a current state of the software under test 112 through an interface (e.g., a UI for desktop applications. For instance, the accessibility layer or function framework are used by applications, such as screen readers, for low vision users. In some examples, a software state observed by the testing agent 122 includes interface objects (e.g., visible and not visible interface objects), where interacting with an interface object produces a second state with different interface objects. The testing agent 122 observes the UI elements that are on screen of the test machine 102, which UI elements that can or cannot be interacted with, etc. In other examples, the testing agent 122 interacts with software under test 112 via REST APIs (e.g., for RESTful services).

Various types of event data 106 are collected during testing the software under test 112. In some examples, events are captured as action data 104 and associated state data 114. Action data 104 corresponding to actions the various testing agents 122 performed on the test machines 102 is collected and stored, such as, an action (e.g., select, hover, enter text) performed on an interface element (e.g., button, menu or menu item, text box, checkbox, dropdown list, hyperlink or other type of link) of an interface of the software under test 112. The number of available actions for each state may be dynamic. For example, the software under test 112 may have 100,000 or more available actions. In further examples, state data 114 observed by the various testing agents 122 is collected and stored. In some examples, the state data 114 is collected prior to and/or in response to an action performed and/or other changes (e.g., content changes) made via the testing agent 122. The state data 114 for a current state of the software under test 112 may reveal UI elements, REST calls, or other functionalities of the software under test (e.g., text, images, documents, compressed files in a directory) that may be interacted with from the current state. In some examples, state data 114 for the current state may also include a type of interaction each component is able to receive. In further examples, state data 114 may include other observed state information, such as free disk space, memory usage, etc. State data 114 may, in some cases, indicate system and software health information, such as whether the system crashed, hung, or the like. In some examples, state data 114 takes the form of a collection of software and/or system attributes and corresponding values. In other examples, state data 114 includes an image of the UI that resulted from an action.

In some implementations, the software testing system 120 performs random walk testing, where the software testing system 120 randomly selects a UI element (or other functionality) to interact with and, if multiple interaction types are possible, selects an interaction type. The selected interaction type is then implemented on the selected UI element to trigger a change from the current observed state of the software under test 112 to a resulting state. In examples, both the action taken and the resulting state are recorded by the testing agent 122 as action data 104 and state data 114, respectively, and communicated to the (centralized) software testing system 120. In one aspect, action data 104 and/or state data 114 may be stored by one or more multi-model database services, such as a key-value store. The centralized software testing system 120 may then build a model of the action space by combining the action data 104 and state data 114. By building an action space model, relationships between different actions and resulting states, as indicated by the action and state data, can be understood.

In some examples, event data 106 associated with events that occur during testing various actions is captured in log file messages 126 and included in event log files 116. The software under test 112 records descriptive information corresponding to details of events that occur in the software under test 112 in log file messages 126). In examples, log file messages 126 include (sometimes verbose) human-readable details to help engineers understand details of events (e.g., failing to complete a user scenario, an exception, a crash, an unexpected event, a warning, a degradation in performance, an assertion error, the surfacing of an error message, completion of a task or a particular user scenario) in the software under test 112. Each log file message 126 may include various parameters and values (e.g., a timestamp, an event identifier, a log level, a natural language text string). The following is an example log file message 126: [2032 Jan. 1 12:37:42]; ERROR—Exception: NullReferenceException; Message: Object reference not set; Stack Trace: MyApp.MessageService.SendMessage; Context: Testing 'SendMessage' action. Event log files 116 may be obtained from test machines 102 on an as-needed basis or uploaded automatically (e.g., based on a schedule or a file size threshold). In some examples, a log file message 126 describes an action taken and/or a resulting state. In examples, event log files 116 are stored in a database that serves as a repository for organizing and managing event data.

In some examples, event data 106 associated with events that occur during testing various actions is captured in telemetry event items 136. In examples, telemetry event items 136 are structured data used to log interactions, such as, operations executed to process received requests, exceptions that cause operations to fail, dependency calls to external services, storage, or other endpoints (e.g., a REST API, Structured Query Language (SQL) database, a Hyper-Text Transfer Protocol (HTTP) resource), etc. Telemetry event items 136 may be transmitted in real-time to a listener associated with the software under test 112. In examples, telemetry event items 136 are stored in a database that serves as a repository for organizing and managing event data.

As depicted in FIG. 1, the software testing system 120 includes or is operatively connected to an event of interest (EOI) detector 150 that evaluates event data 106 (e.g., log file messages 126 included in an event log file 116 and/or telemetry event items 136) to determine whether a corresponding event is an EOI 111. The EOI detector 150 includes or is in communication with at least one natural language processing system (NLPS), such as an internal NLPS 110a and/or an external NLPS 110b (collectively, NLPS 110). In examples, the internal NLPS 110a is implemented as part of software testing system 120), whereas the external NLPS 110b is implemented externally to software testing system 120). In some implementations, the NLPS 110 is a language model (LM), which is an artificial intelligence model that has been trained on vast amounts of textual data to understand and generate human-like language. In some examples, the LM is a large language model. Some example LMs include Generative Pre-trained Transformer GPT-3 and GPT-4 by OpenAI, Large Language Model Meta AI (LLaMA) 2, BigScience Large Open-science Open-access Multilingual Language Model (BLOOM), Bidirectional Encoder Representations from Transformers (BERT), Word2Vec, Global and Vectors (GloVe), Embeddings from Language Models (ELMo), and XLNet. The NLPS 110 is accessible via one or more APIs exposed by or exposed to the external NLPS 110. In some examples, the NLPS 110 is implemented using a neural network, such as a deep neural network, that utilizes a transformer architecture to process received input. Such an architecture may employ a decoder or an encoder-decoder structure and self-attenuation mechanisms to process the input data (e.g., a prompt). Initial processing of the prompt includes tokenizing the prompt into tokens that are then mapped to a unique integer or mathematical representation. The integers or mathematical representations are combined into vectors that have a fixed size" These vectors are known as token embeddings.

The initial layer of the transformer model receives the token embeddings. One or more of the subsequent layers in the model may uses a self-attention mechanism that allows the transformer model to weigh the importance of each token in the token embeddings in relation to every other token in the token embeddings. In other words, the self-attention mechanism may compute a score for each token pair, which signifies how much attention should be given to other tokens when encoding a particular token. These scores are then used to create a weighted combination of the token embeddings.

In some examples, one or more layers of the transformer model consists of two primary sub-layers: a self-attention sub-layer comprising the self-attention mechanism and a feed-forward sub-layer comprising a feed-forward neural network. The self-attention mechanism mentioned above is applied to the token embeddings to generate attention output vectors. The feed-forward neural network then applies a simple neural network to each of the attention output vectors. Accordingly, the output of one layer of the transformer model becomes the input to the next layer of the transformer model, which means that each layer incrementally builds upon the understanding and processing of the previous layers. The output of the final layer may be processed and passed through a linear layer and/or a softmax activation function. The linear layer and/or the softmax activation function outputs a probability distribution over all possible tokens in the transformer model's vocabulary. The tokens with the highest probability are selected as the output tokens for the corresponding token embeddings.

In some implementations, the NLPS 110 is a machine learning model that provides, as an output, a determination of whether an event is an event of interest based on an input of log file messages 126 and/or telemetry event items 136 corresponding to the event. The NLPS 110 may be created by first obtaining training data, which may be structured or unstructured data. According to one or more aspects described herein, the training data includes natural language log file messages 126 and/or telemetry event items 136 corresponding to EOIs 111. Once the training data is obtained, a training module receives the training data and an untrained model. The untrained model can have preset weights and biases, which can be adjusted during training. It should be appreciated that the untrained model can be selected from many different model forms depending on the task to be performed. For example, for a model that is to be trained to perform image classification, the untrained model may be a model form of a convolutional neural network (CNN). The training can be supervised learning, semi-supervised learning, unsupervised learning, reinforcement learning, and/or the like, including combinations and/or multiples thereof.

According to one example training implementation, a loss function is defined for identifying EOIs 111. Common loss functions include categorical cross-entropy for classification tasks and mean squared error for regression tasks. Additionally, the dataset is split into training, validation, and test sets. For instance, the training set is used for model training, the validation set helps tune hyperparameters and monitor training progress, and the test set is reserved for final evaluation. The model is trained on the training data using an optimization algorithm (e.g., stochastic gradient descent, Adaptive Moment Estimation (Adam), Root Mean Square Propagation (RMSprop)). During training, the model's weights and biases are adjusted iteratively to minimize the defined loss function. Additionally, over multiple iterations, hyperparameters, such as learning rate, batch size, and model architecture are fine-tuned based on the model's performance on the validation set. This step can involve multiple iterations. Further, regularization techniques (e.g., dropout, weight decay, or early stopping to prevent overfitting) are applied to help the model generalize better to unseen data. Training progress may be monitored by tracking metrics (e.g., loss, accuracy) on the validation set. In some examples, training curves are visualized to assess convergence or potential issues. The model's performance is assessed on the test set to determine its ability to generalize to new, unseen data. Based on the evaluation results, the model may be determined to have achieved a predefined or desired performance threshold or may be further fine-tuned (e.g., hyperparameters may be adjusted and/or additional data may be collected for retraining). The training may be performed multiple times (referred to as "epochs") until a model reaches a predefined or desired performance threshold. Once trained, the EOI detector 150 is configured to detect EOIs 111 based on natural language included in log file messages 126 and/or telemetry event items 136 by applying the trained NLPS 110 to new data (e.g., real-world, non-training data).

According to examples, the EOI detector 150 generates and provides as input to the NLPS 110, a prompt that includes a log file message 126 or a telemetry event item 136 corresponding to the software under test 112, where the prompt causes the NLPS 110 to determine whether the log file message 126 or a telemetry event item 136 describes an EOI 111. An EOI 111 may be described by natural language text included in the log file message 126 or telemetry event item 136. For instance, an example log file message 126 including the natural language text, "Exercised the scenario of user hitting a Submit button" may be determined to describe an EOI 111 based on an understanding that a particular scenario has been tested and/or executed successfully.

The prompt may include one or more expected segments that are expected (or required) to be included in each prompt that is generated. In some examples, a prompt is generated for each log file message 126 included in an event log file 116. In other examples, a single prompt is generated that includes multiple log file messages 126 in the event log file 116 for software under test 112. In yet other examples, one or more prompts are generated for telemetry event items 136 collected during testing the software under test 112. The expected segments of a prompt include a request segment and a criteria segment. The request segment includes a phrase that indicates the requested data. An example phrase for requesting a determination of whether an event is an EOI 111 is, "Is the following log message indicative of an event of interest?" As another example, the request segment includes context information about an EOI 111, such as "important to validating software" in the following example segment, "Is the following important to validating software or neutral?" In examples, the criteria segment provides instructions for the format of the output of the NLPS 110, such as instructions to limit the response to a single phrase, to one word, or another desired length, such as the criteria segment "In one word" included in the example prompt, "In one word, say if this is important or neutral."

In some implementations, the prompt further includes one or more optional segments that are permitted (but are not required) to be included in each prompt that is generated. In some examples, optional segments include an example segment. In further examples, the EOI detector 150 includes example confirmed EOIs 111, a natural language description of a confirmed EOI 111, and/or other types of examples in the example segment. Confirmed EOIs 111 are events that occur during testing actions that have been previously determined or otherwise identified as EOIs 111. In some instances, the prompt includes an example of a target resulting state (e.g., an expected or desired state) of the software under test 112 corresponding to an occurrence of a confirmed EOI 111. In other implementations, the NLPS 110 stores a history of previous prompts (e.g., in a session), where one or more segments (e.g., the example segment) of a first prompt may not need to be repeated in subsequent prompts. In some implementations, the request segment may further include a phrase for requesting the NLPS 110 to determine a category for events determined as EOIs 111. The prompt may further include a description or examples of EOI categories. Some example EOI categories include errors, scenario completions, timeouts, hangs, etc. The prompt may be formed as a data package, a payload, or an object, such as in a JSON format.

The generated prompt is then provided as input to the NLPS 110. The NLPS 110 processes the prompt and generates an output in response. The output generated from the NLPS 110 includes the determination as to whether an event is an EOI 111 based on the log file message 126 or telemetry event item 136 included in the prompt. In some examples, the output further includes a determined category of an identified EOI 111.

The EOI detector 150 receives responses from the NLPS 110 for each log file message 126 or telemetry event item 136. In examples, when the response/output indicates the corresponding event is an EOI 111, the EOI detector 150 identifies the event as an EOI 111. For instance, historically, customers have defined rules for identifying EOIs 111. Some aspects of the present disclosure leverage the NLPS 110 to identify EOIs 111 without defining EOI criteria or rules. Other aspects of the present disclosure enable criteria or rules for defining EOI to be provided to and considered by NLPS 110.

The EOI detector 150 may store EOIs 111 (e.g., log file messages 126 or telemetry event items 136 corresponding to identified EOIs 111) in a database that serves as a repository for organizing and managing event data. In some implementations, the EOI detector 150 transmits EOIs 111 to a listener 160 associated with the software under test 112. For instance, the listener 160 may listen for and respond to reported EOIs 111. The listener 160 is a system or service that is attentive to specific events (EOIs 111) and takes appropriate actions in response to them. The appropriate action is determined based on training, configuration, or previous instruction from a user. Some example listeners 160 include a service that stores EOIs 110 in a database (e.g., for record keeping or further processing), an alerting system that sends messages (e.g., emails, text messages) when EOIs 111 occur (e.g., on a 1:1 basis or as a summary email at an occurrence configured by the user), etc. In further implementations, the EOI detector 150 transmits EOIs 111 to a dashboard 170 (e.g., a health/status dashboard), for instance, to inform users about EOIs 111 that have been observed in the software product during testing and/or alerting users if an event corresponds to a particular type of EOI 111 (e.g., an error or exception). In some implementations, the health/status dashboard 170 and the action sequence generator 140 are listeners 160.

In yet further implementations, EOIs 111 are provided to an action sequence generator 140 that generates action sequences for performing testing tasks and scenarios for software under test 112. In examples, the action sequence generator 140 generates an action sequence to produce the EOI 111 and, thus, achieve a task or scenario corresponding to an EOI 111 (referred to herein as an action sequence of interest 121). In some examples, corresponding event data 106 recorded by the software under test 112 (e.g., log file messages 126 and telemetry event items 136) and/or data recorded by the testing agent 122 (e.g., action data 104 and state data 114) are provided to the action sequence generator 140. The action sequence generator 140 includes or is in communication with an EOI-to-action(s) mapper that generates mappings between EOIs 111 and actions. In some examples, the EOI-to-action(s) mapper performs mappings based on timestamps. For instance, the EOI-to-action(s) mapper may use timestamps associated with the action data 104 and state data 114 to match a particular action with a particular EOI 111.

In some implementations, the action sequence generator 140 identifies patterns of actions that trigger the EOI 111. Action data 104 and state data 114 are analyzed to identify action patterns that produce a target resulting state of the software under test 112 and/or of a test machine 102 on which the software under test 112 is executing. In some examples, the target resulting state is defined by state conditions that reflect achieving a corresponding task or scenario corresponding to the EOI 111. In examples, the action sequence generator 140 uses one or more pattern recognition techniques, such as linear discriminant analysis, quadratic discriminant analysis, maximum entropy classifiers, decision trees, Naive Bayes classifiers, K-nearest-neighbor algorithms, neural networks, and support vector machines. Patterns include the steps taken to perform a task or exercise a scenario, such as changing the font color of text to red. To change the font color of text to red, the steps may include opening a document, selecting text, opening the font menu, and selecting red from available font colors. In some examples, the action sequence generator 140 identifies patterns of actions that produce a resulting (target) software state corresponding to the EOI 111. Different paths for performing a same task may be available. For example, in a word processing application, a font color menu may be found in a task bar, automatically presented in response to selecting text, or selected through a drop-down menu. Thus, at least three different patterns for changing font color are available. One or more of the three different patterns may be identified and tested. In examples, a plurality of different ML models may be trained to identify patterns that trigger EOIs 111, where different ML models are used to detect different types of patterns. In some examples, the ML model is selected based on a determined category of the EOI 111. As an example, a crash pattern detector is trained to detect patterns that cause crashes, while a hang pattern detector is trained to detect patterns that cause hangs. Each EOI category may have its own detector, though a single detector may be trained to detect multiple EOI categories with similar patterns.

In further examples, document frequency models (e.g., TF-IDF) and word association models (e.g., Word2Vec) are used to score the importance of an action or pattern of actions to a specific state, where the specific state corresponds to an EOI 111. Document frequency models (e.g., using TF-IDF techniques) determine how frequently various actions and/or patterns of actions occur within observed actions. For instance, actions that occur frequently, but that are not often associated with an EOI 111, tend to be excluded from an identified pattern. Conversely, actions that are more frequently associated with an EOI 111 tend to be included. In examples, such document frequency models expect input comprising at least text-based content, such as a document, one or more sentences, or a set or words and/or terms. Word association models use techniques, such as word embedding techniques, are used to capture semantic relationships between words and, thus, to find contextually similar actions or states related to the EOI 111. Word embedding models may use a neural network model to learn word associations from a large corpus of text. Once trained, such a model typically detects synonymous words or suggest additional words for a partial sentence. In some examples, actions in the action data 104 and/or state data 114 are not words and are not "natural language." However, natural language processing techniques are adapted to identify action patterns. Top-scoring action patterns are used to generate action sequences of interest 121. That is, the machine learning pipelines produce a mapping of the EOIs 111 to action sequences of interest 121. In examples, generated action sequences of interest 121 are stored in an action sequence database. In some examples, such word association models expect input comprising at least a set of words and/or terms.

One or more testing agents 122 may be instructed to perform an action sequence of interest 121, where a determination is made whether the EOI 111 is reproduced after performing a last action in the action sequence of interest 121. For instance, natural language log file messages 126 and/or telemetry event items 136 are recorded when the action sequence of interest 121 is performed. The natural language log file messages 126 and/or telemetry event items 136 are then evaluated to determine whether the EOI 111 reoccurred (e.g., by the EOI detector 150). In one example, the EOI 111 represents a scenario completion, such as the completion of a task within the software under test 112. In other examples, the EOI 111 represents an exception, a crash, a degradation in performance, an assertion error, the surfacing of an error message, or another type/category of EOI 111.

Figure 2:
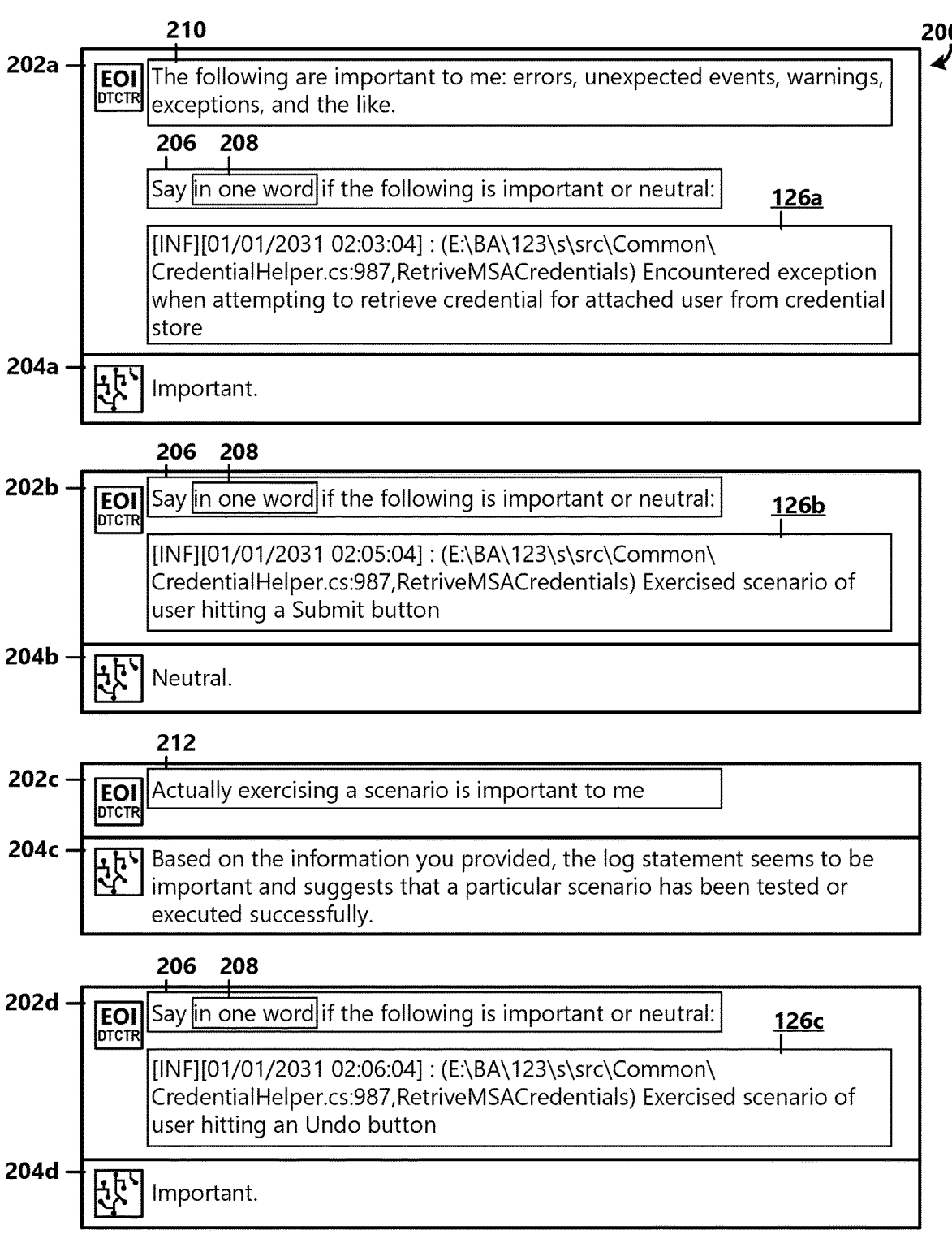
FIG. 2 depicts an example communication flow including communications to and from a natural language processing system for providing automated event of interest identification according to an aspect.

With reference now to FIG. 2, an example communication flow 200 between the EOI detector 150 and the NLPS 110 is depicted. The communication flow 200 includes prompts 202a-202d generated by the EOI detector 150 and corresponding outputs 204a-204d generated in response by the NLPS 110. A first prompt 202a includes a request segment 206 that includes a phrase that indicates the requested data (e.g., "Say in one word if the following is important or neutral:"), where "important" is a descriptor of an EOI 111. The request segment 206 includes a criteria segment 208 including a phrase that indicates a criterion of the requested output (e.g., "in one word").

The first prompt 202a further includes a first log file message 126a corresponding to a first logged event obtained from an event log file 116 logged by software under test 112. For instance, the first log file message 126a includes various parameters and values including a log level, a timestamp, an event identifier, and a natural language text string describing the first logged event. The first log file message 126a may describe an event that occur during testing one or more actions. In some implementations, the first prompt 202a may include an example segment 210 including examples of confirmed EOIs 111, examples of target resulting states corresponding to occurrences of confirmed EOIs 111, a natural language description of a confirmed EOI 111, and/or other types of examples or guidance for determining an EOI 111 (e.g., "The following are important to me: errors, unexpected events, warnings, exceptions, and the like"). In further implementations, an initial request/prompt at the start of a conversation with the NLPS 110 may be generated and sent to the NLPS 110 including instructions for a session of a plurality of subsequent prompts 202a-202d (e.g., "For all the next prompts, [instructions, examples, etc.,] until I say we are done").

In response to the first prompt 202a, the NLPS 110 generates and provides a first output 204a. In the depicted example communication flow 200, the NLPS 110 determines the first log file message 126a corresponds to an EOI 111 and includes, in the first output 204a, a one-word response, "Important". However, in some examples, the NLPS 110 determines the first log file message 126a does not correspond to an EOI 111, and, as a result, NLPS 110 does not generate a first output 204a or provides an output indicating the first log file message 126a is not important. The EOI detector 150 receives the first output 204a, where "Important" is determined as an indication the first log file message 126a corresponds to an EOI 111. In examples, the EOI detector 150 identifies and records the event described by the first log file message 126a as an EOI 111. The EOI detector 150 may further report the EOI 111 (e.g., to a listener 160, dashboard 170, or other downstream system (e.g., provide the EOI 111 to the action sequence generator 140 to generate an action sequence of interest 121 that reproduces the EOI 111).

A second prompt 202b includes the same request segment 206 included in the first prompt 202a and a second log file message 126b corresponding to a second logged event obtained from the event log file 116 of the software under test 112. As depicted, the second log file message 126b includes various parameters, values, and a natural language text string describing the second logged event (e.g., exercising the scenario of hitting a submit button). In response to the second prompt 202b, the NLPS 110 generates and provides a second output 204b including the one-word response, "Neutral." The EOI detector 150 receives the second output 204b, where "Neutral" is determined as an indication the second logged event is not an EOI 111. According to an example, the EOI detector 150 may provide corrective feedback 212 to the NLPS 110, such as in the third example prompt 202c. The example corrective feedback 212 informs the NLPS 110 that the described event (e.g., exercising a scenario) is an EOI 111 (e.g., is an event that is interesting or significant). In response to the third prompt 202c, the NLPS 110 learns from the corrective feedback 212 and provides a third output 204c correcting its previous determination and indicating the second logged event described in the second log file message 126b is an EOI 111. In examples, log file messages 126 included in the event log file 116 that are inserted in subsequent prompts 202d-202n and that describe exercising a scenario are determined to correspond to an EOI 111.

Figure 3:
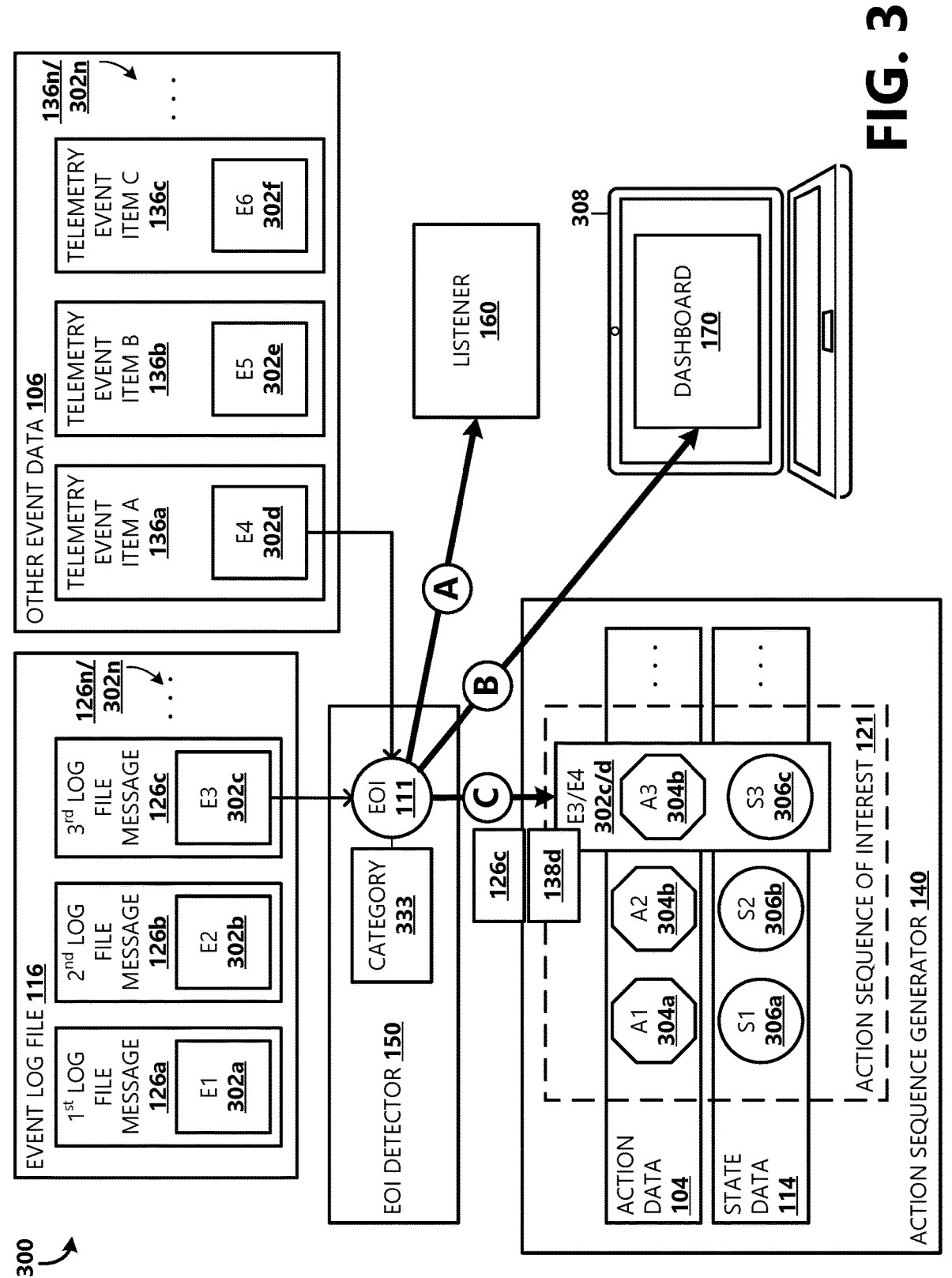
FIG. 3 is a block diagram depicting automated event of interest identification for action sequence of interest generation according to an aspect.

With reference now to FIG. 3, an example of identification of an EOI 111 and subsequent handling of the EOI 111 is illustrated according to aspects of the technology described herein. An event log file 116 corresponding to software under test 112 includes a sequence of log file messages 126a-126n (collectively, log file message 126) recorded during testing various interactions with the software under test 112. For instance, a first log file message 126a corresponds to a first logged event 302a, a second log message 126b corresponds to a second logged event 302b, a third log message 126c corresponds to a third logged event 302c, etc. The EOI detector 150 may use the NLPS 110 to determine the third log file message 126c describes an interesting event and, thus, determine the third logged event 302c is an EOI 111.

In other examples, telemetry event items 136a-136n (collectively, telemetry event item 136) are evaluated by the EOI detector 150, where each telemetry event item 136 records an event occurring during testing various interactions with the software under test 112. For instance, telemetry event item A 136a records a fourth logged event 302d, telemetry event item B 136b records a fifth logged event 302e, and telemetry event item C 136c records a sixth logged event 302f, etc. The EOI detector 150 may use the NLPS 110 to determine telemetry event item A 136a describes an interesting event and, thus, determine the fourth logged event 302d is an EOI 111. In some examples, the fourth logged event 302d may correspond to a logged event 302 (e.g., the third logged event 302c included in the third log file messages 126c) in the event log file 116.

As described previously, the EOI detector 150 evaluates event data 106, such as log file messages 126, telemetry event items 136, and/or other event data 106 using natural language processing to determine whether an associated logged event 302 is an EOI 111. For instance, the EOI detector 150 generates and provides a prompt as input to the NLPS 110 requesting the NLPS provide a response indicating whether natural language text included in the event data 106 describes an EOI 111 (e.g., a significant event). As an example, the NLPS 110 provides a response that the third log file message 126c and/or telemetry event A 136a is determined to correspond to an EOI 111.

In some examples, and as represented in FIG. 3 by the circled letter A, an identified EOI 111 is reported to a listener 160 of the health of the software under test 112. In other examples, and as represented by the circled letter B, an identified EOI 111 is reported as observed occurring in the software under test 112 during testing to computing device 308 to be surfaced in a dashboard 170 UI. In some examples, the EOI detector 150 uses the NLPS 110 to determine a type or category 333 of a determined EOI 111 and provides the category 333 as metadata when reporting the EOI 111 to the listener 160. For instance, the category 333 can be used to filter reported EOIs 111 by category type(s). In further examples, and as represented by the circled letter C, an identified EOI 111 is reported to the action sequence generator 140 for generating an action sequence of interest 121 based on the identified EOI 111.

According to some examples, action data 104 and state data 114 are analyzed to identify action patterns that produce a target resulting state (e.g., an expected or desired state) of the software under test 112 and/or of a test machine 102 on which the software under test 112 is executing. In the depicted example, the action sequence generator 140 determines a first action 304a, a second action 304b, and a third action 304c trigger the EOI 111. For instance, the first action 304a may cause a resulting first state 306a of the software under test 112, the second action 304b may cause a resulting second state 306b, and the third action 304c may cause a resulting third state 306c.

The action sequence of interest 121 is replayed by a testing agent 122. In some implementations, state data 114 corresponding to the resulting third state 306c is evaluated to determine whether state conditions indicate the EOI 111 has been triggered by the action sequence of interest 121. For instance, replay testing differs from random walk testing in that in replay testing, the testing agent 122 attempts to take the actions associated with a predefined action sequence of interest 121 and a determination is made as to whether a corresponding EOI 111 is triggered. For example, when an action sequence of interest 121 is associated with a production of a negative event, replay testing attempts to reproduce the action sequence, for instance, to determine whether a bug that produced the negative event has been fixed. In some implementations, replay testing is executed on a second version of the software under test 112 in which the EOI 111 and action sequence of interest 121 was identified. For example, when a bug is detected as an EOI 111 during random walk testing of a first version of the software under test 112, then a pattern that produces the bug is identified. Presumably, developers attempted to fix the bug and issued a second version of the software under test 112. The replay testing will then attempt to perform the action sequence of interest 121 that revealed the bug in the second version of the software under test 112.

After action sequences of interest 121 are identified, at least a partial model of the action space is built using action data 104 and state data 114 received from the plurality of test machines 102 conducting the testing. In examples, testing on the test machines 102 may be split into different modes. A first portion of test machines 102 may be allocated to performing (e.g., continuing) random testing, which serves an exploration function. A second portion of the test machines 102 may be allocated to replay testing, which seeks to replay identified action sequences of events of interest. A third portion of test machines 102 may be allocated to pioneer testing. Pioneer testing performs random actions, except that the random actions are directed to an unexplored portion of the action space. For example, an available UI element or a REST call that has not previously been interacted with through the random testing is selected as a starting point for pioneer testing. Pioneer testing helps ensure coverage for all aspects of a software being tested. Additional portions may be devoted to running computationally derived action patterns, derived from heuristics, statistical methods, or machine learning algorithms.

In a simplified example, the EOI 111 represents a scenario completion of producing text that is bolded, underlined, and italicized. Thus, during replay testing, the expected resulting third state 306*c* produced from performing the last action in the action sequence of interest 121 may be bolded, underlined, and italicized text, where the first action 304*a* corresponds to bolding text, the second action 304*b* corresponds to underlining the text, and the third action 304*c* corresponds to italicizing the text. State data 114 may be evaluated to determine whether state conditions of the expected resulting third state 306*c* are reproduced. In other implementations, other event data 106, such as log file messages 126 and/or telemetry event items 136 are evaluated to determine whether the EOI 111 has been triggered by the action sequence of interest 121. For instance, when the EOI 111 corresponds to a specific logged error is logged, the software testing system 120 may determine if the EOI 111 is achieved by evaluating whether the error was logged by the software under test 112 during testing.

With reference now to FIG. 4A, a flow chart is illustrated of an example method 400 for providing automated EOI 111 detection and reporting. At operation 402, the example method 400 includes receiving event data 106 of events logged by software under test 112 during testing. In some examples, the event data 106 includes an event log file 116 recording a plurality of log file messages 126 and/or telemetry event items 136 corresponding to a plurality of the logged events. In examples, the log file messages 126 and/or telemetry event items 136 include natural language text describing the events. For instance, the log file messages 126 are unstructured and include natural language text intended to be read by a human, while the telemetry event items 136 include structured data optimized for being machine readable. In some implementations, action data 104 and/or state data 114 recorded by testing agents 122 during testing are received.

At operation 404, the method 400 includes generating a prompt 202 to the NLPS 110 requesting for a determination as to whether event data 106 (e.g., a log message 126 in the event log file 116, a telemetry event item 136, action data 104, and/or state data 114) is important (e.g., describes an EOI 111). For instance, a first event data item is included in a first prompt 202, where the first prompt 202 may further include an example of a confirmed EOI 111, examples of target resulting states from execution of a confirmed EOI 111, a natural language description of a confirmed EOI 111, and/or other types of examples or guidance for determining an EOI 111 (e.g., "The following are important to me: completion of scenarios, errors, unexpected events, warnings, exceptions, and the like"). In some examples, the first prompt 202 further includes a request for the NLPS 110 to determine an EOI category when event data 106 is determined as important. In some examples, the EOI detector 150 generates a prompt 202 for each of the plurality of log file messages 126 in the event log file 116, each telemetry event item 136, etc. In other examples, the EOI detector 150 includes the plurality of log messages 126, telemetry event items 136, etc., in fewer prompts 202 (e.g., a single prompt).

At operation 406, the method 400 includes providing the prompt(s) 202 as input to the NLPS 110, where a determination is included in one or more outputs 204. At operation 408 of the example method 400, a response from the NLPS 110 is received including an output 204 of the determination of whether the event data 106 describes an important event. In some examples, the determination indicates the logged event corresponding to the event data 106 is an EOI 111. In other examples, the determination indicates the logged event is not an EOI 111 or indicates that is cannot be determined whether the logged event is an EOI 111. In further examples, the output 204 includes an EOI category corresponding to the logged event (e.g., important event).

At operation 410, events corresponding to event data items determined by the NLPS 110 as important are identified by the EOI detector 150 as EOIs 111. At operation 412, the EOIs 111 are reported to one or more downstream systems. For instance the EOI detector 150 transmits EOIs 111 to a listener 160 that may listen for and respond to EOIs 111 occurring in the software under test 112, to a dashboard 170 (e.g., a health/status dashboard) to inform users about EOIs 111 that have been observed in the software product during testing and/or alerting users if an event corresponds to a particular EOI category (e.g., an error or exception), to the action sequence generator 140 to generate action sequences of interest 121 for triggering the EOIs 111 in further testing of the software under test 112.

With reference now to FIG. 4B, a flow chart is illustrated of an example method 450 to generate an action sequence of interest 121 to trigger an EOI 111, such as an EOI 111 identified by the EOI detector 150 in method 400 of FIG. 4A. At operation 452, a pattern of actions 304 is mapped to the EOI 111. Timestamps associated with the EOI 111 are used to map the EOI 111 to timestamps associated with action data 104 and state data 114, and thus, match at least one action with a particular EOI 111. In examples, the action sequence generator 140 uses one or a combination of ML models to identify one or more patterns of actions 304 that trigger the EOI 111.

At operation 454, the one or more action patterns are stored as one or more action sequences of interest 121.

At operation 456, the one or more action sequences of interest 121 are exercised against the software under test 112. In some examples, the action sequence of interest 121 is associated with a determined EOI category and can be requested based on the EOI category. In examples, additional log file messages 126, telemetry event items 136, action data 104, and state data 114 are logged and received by the software testing system 120 in response to performing the action sequence of interest 121.

FIG. 5 and the associated description provide a discussion of a variety of operating environments in which examples of the invention may be practiced. However, the devices and systems illustrated and discussed with respect to FIG. 5 is for purposes of example and illustration and is not limiting of a vast number of computing device configurations that may be utilized for practicing aspects of the invention, described herein. FIG. 5 is a block diagram illustrating physical components (i.e., hardware) of a computing device 500 with which examples of the present disclosure may be practiced. In a basic configuration, the computing device 500 may include at least one processing unit 502 and a system memory 504. in examples, the processing unit(s) (e.g., processors) are referred to as a processing system. Depending on the configuration and type of computing device, the system memory 504 may comprise volatile storage (e.g., random access memory), non-volatile storage (e.g., read-only memory), flash memory, or any combination of such memories. The system memory 504 may include an operating system 505 and one or more program modules 506 suitable for running software applications 550 (e.g., the software testing system 120, the testing director 130, the action sequence generator 140, the EOI detector 150, the listener 160, the dashboard 170, and/or the NLPS 110).

The operating system 505, for example, may be suitable for controlling the operation of the computing device 500.

Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including one or more of the operations of the methods illustrated in FIG. 4A and/or FIG. 4B. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (chip). Examples of the present disclosure may also be practiced using other technologies capable of performing logical operations such as, for example, AND, OR, and NOT, including mechanical, optical, fluidic, and quantum technologies.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, radio frequency (RF), infrared, and other wireless media.

According to an aspect, a method is provided, comprising: receiving event data recorded in association with a logged event during testing of software under test, the event data comprising natural language text describing the logged event; providing, to a natural language processing system (NLPS): the event data; a request to determine whether the logged event is an event of interest; and a description of a confirmed event of interest; receiving a response from the NLPS indicating a determination made by the NLPS as to whether the logged event is the event of interest; and recording the logged event determined as the event of interest by the NLPS as the event of interest.

According to another aspect, a computing system is provided, comprising: a processing system; and memory storing instructions that, when executed, cause the computing system to: receive event data recorded in association with a logged event during testing of software under test; generate as input for a natural language processing system (NLPS) including: a request for the NLPS to determine whether the logged event is an event of interest; and the event data; provide the input to the NLPS; receive a response from the NLPS indicating the logged event is the event of interest; record the logged event as the event of interest; and report the event of interest.

According to another aspect, a software testing system is provided, comprising: a processing system; and memory storing instructions that, when executed, cause the software testing system to perform operations comprising: receiving event data recorded in association with a logged event during testing of software under test, the event data including at least one of: a log file message, a telemetry event item, action data, or state data; generating a prompt for a natural language processing system (NLPS) including: a request for the NLPS to determine whether the logged event is important; and the event data; providing the prompt as input to the NLPS; receiving a response from the NLPS indicating the logged event is important; identifying the logged event as an event of interest; and reporting the event of interest.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. A method comprising:

Receiving event data recorded in association with a logged event during testing of software under test;

providing input to a natural language processing system (NLPS) trained to identify action patterns using actions in the event data, wherein the input comprises:

the event data;

a request segment of a prompt included in the input, wherein the request segment includes a request to determine whether the logged event is an event of interest, and wherein the request comprises an indication of a type of event of interest to identify; and a description of a confirmed event of interest, wherein the confirmed event of interest is an event occurring during previous software testing and causing a resulting software state that is relevant to validating the software under test;

receiving a response from the NLPS indicating a determination made by the NLPS as to whether the logged event is the event of interest;

recording the logged event as the event of interest;

evaluating the event data to determine an action pattern that triggers the event of interest; and generating a mapping of the event of interest to an action sequence of interest based on the action pattern, wherein the action sequence of interest is executable to reproduce to the event of interest.

2. The method of claim 1, wherein the event data comprises a log file message included in an event log file.

3. The method of claim 1, wherein the event data comprises a telemetry event item including structured data that captures an interaction with the software under test.

4. The method of claim 1, further comprising reporting the event of interest.

5. The method of claim 4, wherein reporting the event of interest comprises transmitting the event of interest to a listener that performs an action in response to reported event of interest, the action including storing the event of interest in a database.

6. The method of claim 4, wherein reporting the event of interest comprises transmitting the event of interest to a dashboard.

7. The method of claim 1, further comprising:

providing the action sequence of interest to a testing agent for execution.

8. The method of claim 1, wherein providing the event data to the NLPS further comprises providing an example of the confirmed event of interest.

9. The method of claim 1, wherein providing the event data to the NLPS further comprises providing instructions to limit a number of words included in the response.

10. The method of claim 1, further comprising:

when the determinations made by the NLPS indicate the logged event is the event of interest, requesting a category of the event of interest; and receiving, from the NLPS, the category of the event of interest.

11. The method of claim 10, further comprising reporting the event of interest and the category of the event of interest.

12. A computing system, comprising: a processing system; and memory storing instructions that, when executed, cause the computing system to:

receive event data recorded in association with a logged event during testing of software under test;

generate input for a natural language processing system (NLPS) trained to identify action patterns using actions in the event data, the input including:

a request segment of a prompt included in the input, wherein the request segment includes a request for the NLPS to determine whether the logged event is an event of interest, and wherein the request comprises an indication of a type of event of interest to identify; and the event data;

provide the input to the NLPS;

receive a response from the NLPS indicating the logged event is the event of interest;

record the logged event as the event of interest;

report the event of interest;

evaluate the event data to determine an action pattern that triggers the event of interest; and generate a mapping of the event of interest to an action sequence of interest based on the action pattern, wherein the action sequence of interest is executable to reproduce to the event of interest.

13. The computing system of claim 12, wherein the event data comprises at least one of:

an unstructured log file message included in an event log file; or a structured telemetry event item.

14. The computing system of claim 12, wherein in reporting the event of interest, the instructions cause the computing system to report the event of interest to a downstream service comprising at least one of:

a listener that acts on the reported event of interest;

a dashboard; or an action sequence generator.

15. The computing system of claim 12, wherein the input further comprises an example of the event of interest.

16. The computing system of claim 12, wherein the event of interest is one of:

a completion of a user scenario;

an exception; or a warning.

17. The computing system of claim 12, wherein:

the input further comprises a request for a category of the event of interest when an event of interest is determined; and the response further includes the category of the event of interest.

18. A software testing system, comprising:

a processing system; and memory storing instructions that, when executed, cause the software testing system to perform operations comprising:

receiving event data recorded in association with a logged event during testing of software under test, the event data including at least one of: a log file message, a telemetry event item, action data, or state data;

generating a prompt for a natural language processing system (NLPS) trained to identify action patterns using actions in the event data, the prompt including:

a request segment comprising a request for the NLPS to determine whether the logged event is important, wherein the request comprises an indication of a type of event of interest to identify; and the event data;

providing the prompt as input to the NLPS;

receiving a response from the NLPS indicating the logged event is important;

identifying the logged event as an event of interest;

evaluating the event data to determine an action pattern that triggers the event of interest; and generating a mapping of the event of interest to an action sequence of interest based on the action pattern, wherein the action sequence of interest is executable to reproduce to the event of interest.

19. The software testing system of claim 18, wherein the prompt further comprises at least one of:

instructions to limit a number of words included in the response;

an example of an important event; or a description of an important event.

20. The software testing system of claim 18, the operations further comprising:

storing the action sequence of interest; and performing the action sequence of interest, wherein the performing causes the software under test to reproduce the event of interest.

\* \* \* \* \*